April 10, 1951 L. C. RIEBE 2,548,393
TOOL FOR HANGING WALLPAPER
Filed Oct. 28, 1949 2 Sheets-Sheet 1
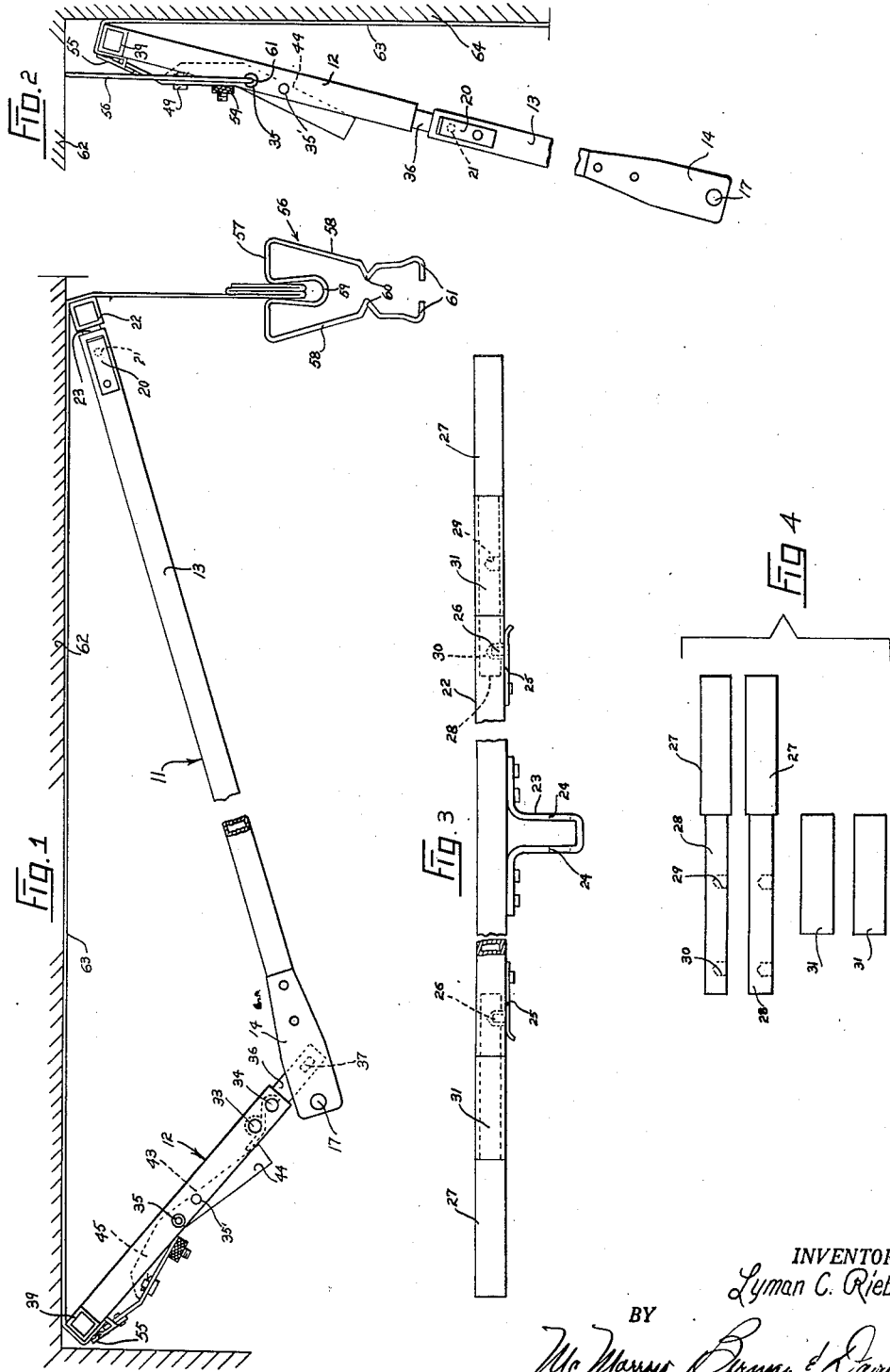
INVENTOR.
Lyman C. Riebe
BY April 10, 1951 L. C. RIEBE 2,548,393
TOOL FOR HANGING WALLPAPER
Filed Oct. 28, 1949 2 Sheets-Sheet 2
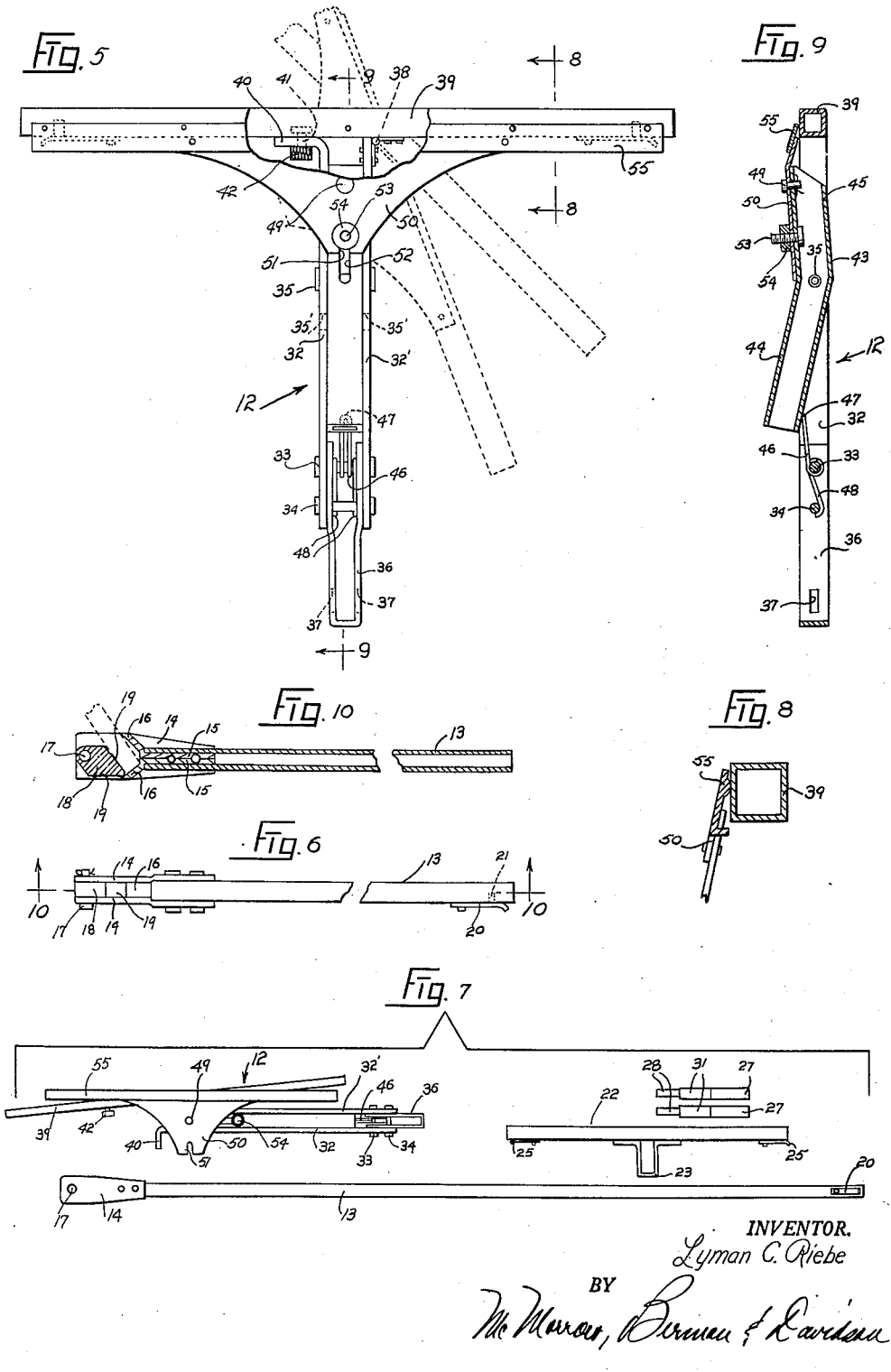
INVENTOR.
Lyman C. Riebe
BY
McMorrow, Berman & Davidson Patented Apr. 10, 1951

2,548,393

UNITED STATES PATENT OFFICE 2,548,393

TOOL FOR HANGING WALLPAPER

Lyman C. Riebe, Lafayette, Ind.

Application October 28, 1949, Serial No. 124,100

3 Claims. (Cl. 216—7)

This invention relates to paperhangers' tools, and more particularly to a device for use in applying wallpaper either to a ceiling, or for applying wallpaper to a side wall.

A main object of the invention is to provide a novel and improved tool for hanging wallpaper, said tool being simple in construction, being easy to manipulate, being very flexible in application, and greatly reducing the time and labor required in hanging wallpaper.

A further object of the invention is to provide an improved paper-hanging implement, said implement being inexpensive to manufacture, involving only a few parts, being easy to manipulate, and being adjustable for use in various different wallpaper-hanging operations.

Further objects and advantages of the invention will become apparent from the following description and claims, and from the accompanying drawings, wherein:

Figure 1 is a side elevational view of a paperhanging implement according to the present invention, shown in use for applying wallpaper to a ceiling;

Figure 2 is a side elevational view of the implement of the present invention, shown in use for applying wallpaper to a side wall;

Figure 3 is a top plan elevational detail view of a transverse paper-supporting head member employed with the handle portion of the implement of Figure 1;

Figure 4 is an elevational view showing a group of attachments employed in extending the length of the supporting bar of Figure 3;

Figure 5 is a top plan detail view, partly broken away, of a paper-clamping member employed with the implement of Figure 1;

Figure 6 is a side elevational view of the main handle portion of the implement of Figure 1;

Figure 7 is a view showing the various elements of the implement of Figure 1, shown in disassembled position;

Figure 8 is an enlarged cross-sectional detail view taken on line 8—8 of Figure 5;

Figure 9 is a cross-sectional detail view taken on line 9—9 of Figure 5;

Figure 10 is a longitudinal cross-sectional view taken on line 10—10 of Figure 6.

Referring to the drawings, the apparatus broadly comprises two cooperating tool portions, shown generally at 11 and 12 in Figure 1. Tool portion 11 comprises an elongated, tubular shaft member or handle 13, as shown in Figures 6 and 10, to one end of which are secured one end of the parallel plate members 14, 14 which provide a socket therebetween. Secured in the end of the shaft member 13 are bar members 15, 15 formed with the outer-diverging wings 16, 16 positioned between the parallel plate member 14, 14. Connecting the end portions of the plate members 14, 14 is a transverse pin 17 on which is pivotally mounted an abutment member or block 18 formed with convergent rear surfaces 19, 19. The rear end of the abutment member at the apex defined by surfaces 19, 19 is engageable with either of the wings 16, 16, and when thus engaged, one of the surfaces 19 is substantially parallel to the opposite wing 16, defining with plate members 14, 14 a substantially rectangular socket extending at an obtuse angle with respect to the axis of shaft member 13.

Secured to the opposite end portion of shaft member 13 is a spring arm 20 carrying an inwardly-directed pin 21 projecting inwardly into the shaft member through an aperture formed therein. Designated at 22 is a tubular crossbar of square cross-section having centrally secured thereto a U-shaped strap member 23. The strap member 23 is telescopically and slidably receivable in the end of the shaft member 13, the side arms of the strap member being formed with apertures 24. The pin 21 is lockingly receivable in one of the apertures 24 to lock the strap member 23 in the shaft member 13, thereby detachably securing the cross-bar 22 in transverse relation to the end of the shaft member 13.

Secured to the ends of the cross-bar 22 are spring arms 25, 25 provided with inwardly-directed studs 26 projecting into the cross-bar through openings formed therein. Designated at 27, 27 are respective extension bars. Each extension bar 27 has a reduced shank 28 formed with a pair of spaced recesses 29 and 30. The extension bar 27 may be releasably secured in an end of cross-bar 22 with shank 28 fully inserted in the cross-bar and the stud 26 at said end engaging in the recess 29 of the shank. The extension bar 27 may be releasably secured in said end of the cross-bar in further extended position, as shown in Figure 3, wherein the stud 26 engages in the outer recess 30 of the shank. Under the latter conditions, a sleeve 31 covers the portion of shank 28 not received in the crossbar, as shown in Figure 3. Figure 4 discloses two extension bars 27 and two sleeves 31, as employed in Figure 3.

Referring now to Figures 5 and 9, it will be seen that the tool portion 12 comprises a pair of parallel bar members 32, 32' secured together adjacent one end by a pair of transverse rivets 33, 34 and further secured at an intermediate point of the tool portion by a transverse hollow rivet 35. Designated at 36 is a U-shaped strap member secured between the bar members 32, 32' by the rivets 33, 34. The outer portions of the arms of the U-shaped strap member 36 are formed with openings 37, 37. The parallel bar members 32, 32' and strap 36 provide a connecting member.

Hinged to the end of the bar member 32' at 38 is a hollow cross-bar 39. The end of the bar member 32 is formed with a right-angled flange 40 which is formed with an opening through which projects a threaded stud 41 carried by the cross-bar 39. The cross-bar 39 is detachably secured in transverse position with respect to bar members 32, 32' by a thumb screw 42 threaded on stud 41.

Pivotally mounted on hollow rivet 35 is an angled, hollow lever 43 having a lower arm 44 and an upper arm 45, as viewed in Figures 5 and 9. Coiled on rivet 33 is a spring 46 having a center loop 47 engaging rearwardly on arm 44 and having ends 48 anchored against rivet 34. Spring 46 biases lever 43 clockwise, as viewed in Figure 9. Pivotally secured at 49 to the upper portion of arm 45 is a generally-triangular plate member 50 formed with a notch 51 at its apex. Slidably mounted in a slot 52 in arm 45 is a bolt 53 engageable in the notch 51 and provided with a thumb screw 54, whereby the plate member 50 may be rigidly secured to the arm 45. Secured to the top margin of plate member 50, as seen in Figures 5 and 9, is a clamping strip 55 which is arranged to engage the side surface of cross-bar 39 at a short distance below the top surface of said cross-bar, as viewed in Figures 8 and 9.

Designated at 56 is a resilient wire clip formed in generally U-shape and having the top arm 57 and the depending side arms 58, 58, as viewed in Figure 1. The top arm 57 is formed with a loop 59. The side arms 58, 58 are formed with intermediate, inwardly-directed V-bends 60, 60 with inwardly-directed end bends 61, 61.

As shown in Figure 1, the apparatus may be employed for applying wallpaper to a ceiling 62 by positioning the U-shaped strap member 36 of tool portion 12 in the angled socket defined between the plate members 14, 14 of tool portion 11, whereby the tool portion 12 is supported at an obtuse angle to the tool portion 11. The end of the wallpaper section 63 to be applied is clamped between cross-bar 39 and clamping strip 55, as shown in Figure 1, and the remainder of the section is stretched over the opposite cross-bar 22. The depending portion of the wallpaper section may be folded and secured in the loop 59 of clip 56, as shown, whereby the depending portion of the paper does not interfere with the manipulation of the apparatus.

The paper is placed on the cross-bars, as above described, after it has been trimmed and coated with paste. The paper is first picked up with tool portion 11, the end of the paper is clamped in tool portion 12 by means of lever 43 and clamping strip 55, the paper is then stretched, and the U-shaped strap member 36 of tool portion 12 is then placed in the socket defined between the plate members 14, 14 of tool portion 11. The surface of the paper is now smooth and flat. The apparatus is then held in one hand and the cross-bar 39 is placed in the ceiling corner at which the paper is to be applied and lined up for applying the paper. Still holding the apparatus in one hand, the tool portion 12 is removed (by rotating lever arm 44 inwardly, thereby releasing the paper, disengaging strap member 36 from its socket by rotating shaft 13 downwardly), and said tool portion 12 is rotated upwardly pushing the end of the paper into the corner. The stretched portion of the paper has now been applied to the ceiling. The remainder of the paper section is then unfolded and smoothly applied to the ceiling by pushing the cross-bar 22 of tool portion 11 rearwardly along the ceiling.

In applying wallpaper to a side wall 64, as shown in Figure 2, the paper is secured to the cross-bar 39 of tool portion 12 by the clamping strip 55, and, in the case of high ceilings, the handle 13 of tool portion 11 is employed as a handle for the tool portion 12. This is done by telescoping the end of said handle over the U-strap 36, with stud 21 of spring arm 20 engaging in one of the openings 37 of the U-strap to lock the shaft 13 to the tool portion 12. As shown in Figure 2, the ends 61, 61 of the clip member 56 may be engaged in the ends of hollow rivet 35 and the clip member may be positioned vertically, thereby acting as a feeler extension engaging the ceiling 62 to place the paper at the desired height with respect to the ceiling, as when a border is to be used adjacent the ceiling. When no border is to be used, the ends 61, 61 are engaged in openings 35' formed in the arms 32, 32' below the rivet 35. The V-bends 60 of the feeler member 56 act as stops to engage the bars 32, 32' to retain the feeler member in the position shown in Figure 2.

In the "high" position of the feeler member 56, the feeler member will automatically rotate downwardly to an inoperative position when the tool portion 12 is pushed inwardly and upwardly, allowing the end of the paper to be pushed up into the corner when said end is released by rotating lever arm 14 inwardly.

When the feeler member 56 is in its "low" position, it does not interfere with the pushing of the paper upwardly into the corner after the end of the paper has been released from the clamping strip 55.

After the end of the paper has been pushed into the corner, as above described, the remainder of the paper may be smoothed on the side wall 64 employing the cross-bar 39 of the tool portion 12.

When the apparatus is not in use, it may be taken apart and stored in the detached condition of the parts shown in Figure 7.

While a specific embodiment of a paper-hanging implement has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A paper hanging apparatus comprising a longitudinally extending connecting member, a first bar arranged transversely of said connecting member adjacent one end thereof and connected intermediate its ends to said one end of said connecting member for movement from its transverse position to a position longitudinally of said connecting member, a longitudinally extending handle having one end arranged in spaced end to end relation with respect to the other end of said connecting member, a longitudinally extending socket arranged adjacent said one end of said handle and having one end secured to said one end of said handle, a block positioned within said socket adjacent the other end and mounted in said socket for rocking movement about an axis transverse of said socket, a pair of diverging wings extending longitudinally of and fixedly positioned within said socket and spaced inwardly of said block and forming with said block a means for slidably receiving and supporting the other end of said connecting member, a second bar arranged transversely of said handle adjacent the other end thereof and slidably supported intermediate its ends on said other end of said handle, a clamping strip positioned in parallel longitudinal relation with respect to said first bar and operatively connected to said connecting member for movement into and out of abutting relation with respect to said bar, and hand actuable means supported on said connecting member and connected to said strip for effecting the movement of the latter out of abutting relation with respect to said bar.

2. A paper hanging apparatus comprising a longitudinally extending connecting member, a first bar arranged transversely of said connecting member adjacent one end thereof and connected intermediate its ends to said one end of said connecting member for movement from its transverse position to a position longitudinally of said connecting member, a longitudinally extending handle having one end arranged in spaced end to end relation with respect to the other end of said connecting member, a longitudinally extending socket arranged adjacent said one end of said handle and having one end secured to said one end of said handle, a block positioned within said socket adjacent the other end and mounted in said socket for rocking movement about an axis transverse of said socket, a pair of diverging wings extending longitudinally of and fixedly positioned within said socket and spaced inwardly of said block and forming with said block a means for slidably receiving and supporting the other end of said connecting member, a second bar arranged transversely of said handle adjacent the other end thereof and slidably supported intermediate its ends on said other end of said handle, a clamping strip positioned in parallel longitudinal relation with respect to said first bar and operatively connected to said connecting member for movement into and out of abutting relation with respect to said bar, hand actuable means supported on said connecting member and connected to said strip for effecting the movement of the latter out of abutting relation with respect to said bar, and spring means operatively connected to the hand actuable means for urging said strip into its position of abutting relation with respect to said first bar.

3. A paper having apparatus comprising a longitudinally extending connecting member, a first bar arranged transversely of said connecting member adjacent one end thereof and connected intermediate its ends to said one end of said connecting member for movement from its transverse position to a position longitudinally of said connecting member, a longitudinally extending handle having one end arranged in spaced end to end relation with respect to the other end of said connecting member, a longitudinally extending socket arranged adjacent said one end of said handle and having one end secured to said one end of said handle, a block positioned within said socket adjacent the other end and mounted in said socket for rocking movement about an axis transverse of said socket, a pair of diverging wings extending longitudinally of and fixedly positioned within said socket and spaced inwardly of said block and forming with said block a means for slidably receiving and supporting the other end of said connecting member, a second bar arranged transversely of said handle adjacent the other end thereof and slidably supported intermediate its ends on said other end of said handle, a clamping strip positioned in parallel longitudinal relation with respect to said first bar and operatively connected to said connecting member for movement into and out of abutting relation with respect to said bar, hand actuable means supported on said connecting member and connected to said strip for effecting the movement of the latter out of abutting relation with respect to said bar, spring means operatively connected to the hand actuable means for urging said strip into its position of abutting relation with respect to said first bar, and a locking element carried by said first bar and engageable with the adjacent portion of said connecting member for holding said bar in its transverse position.

LYMAN C. RIEBE.

REFERENCES CITED

The following references are of record in the file of this patent:

UNITED STATES PATENTS

| Number | Name | Date |
| --- | --- | --- |
| 369,029 | Randolph | Aug. 30, 1887 |
| 387,792 | McAfee | Aug. 14, 1888 |
| 1,044,484 | Brown | Nov. 19, 1912 |
| 1,199,269 | Hammersley | Sept. 26, 1916 |
| 1,584,273 | Burkey | May 11, 1926 |